Figure 1:
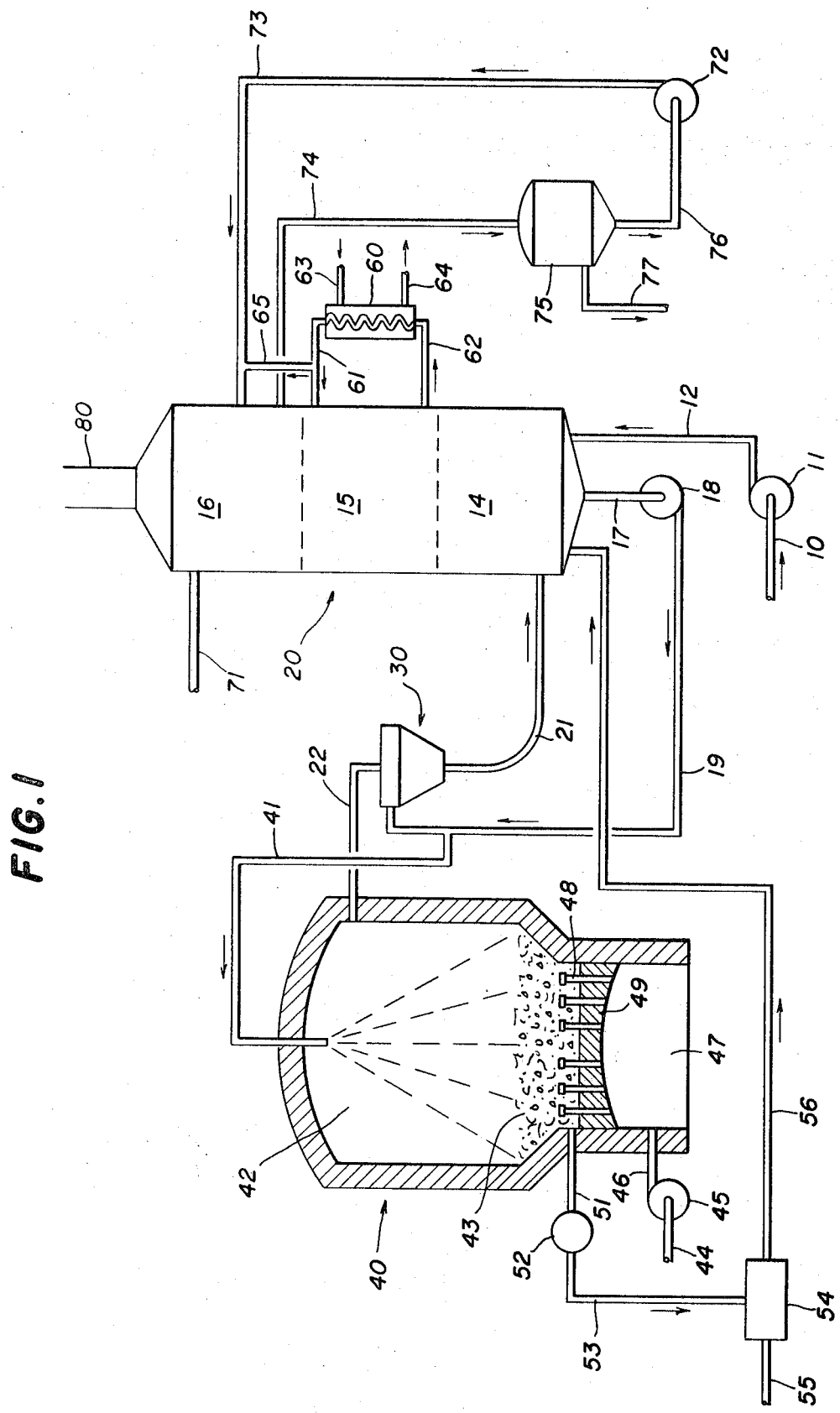

United States Patent [19]
Copeland

[11] 3,864,192
[45] Feb. 4, 1975

[54] APPARATUS FOR PRODUCING AMMONIA-BASE PULPING LIQUOR FROM SPENT LIQUOR

[75] Inventor: George G. Copeland, Western Springs, Ill.

[73] Assignee: Copeland Systems Incorporated, Oakbrook, Ill.

[22] Filed: Dec. 20, 1971

[21] Appl. No.: 209,861

[52] U.S. Cl.......... 159/4 A, 159/4 CC, 159/4 VMS, 159/16 A, 159/DIG. 3, 162/36
[51] Int. Cl............................ B01d 1/16, B01d 1/14
[58] Field of Search ......... 159/47 WL, DIG. 3, 4 A, 159/48 R; 23/262; 162/36

[56] References Cited
UNITED STATES PATENTS

| 3,296,064 | 1/1967 | Cann..................... | 162/36 |
| 3,309,262 | 3/1967 | Copeland et al........ | 162/30 |
| 3,462,343 | 8/1969 | Phillips.................. | 162/36 |
| 3,463,216 | 8/1969 | Miles..................... | 159/47 WL |
| 3,635,790 | 1/1972 | Heath.................... | 162/36 |

OTHER PUBLICATIONS
"Dorr-Oliver" article – Chemical Week, 7-31-65, p. 31, Vol. 97, No. 5.

Primary Examiner—Jack Sofer
Attorney, Agent, or Firm—Merriam, Marshall, Shapiro & Klose

[57] ABSTRACT

Ammonia-base bisulfite spent pulping liquor is combined with magnesia thereby freeing ammonia and forming dilute magnesium-base bisulfite spent liquor. The mixture is concentrated by use of heat from hot exhaust gases from a fluidized bed reactor. The concentrated magnesium-base bisulfite spent liquor is fed into a fluidized bed reactor, in which the bed contains magnesia, and burned therein. The hot exhaust gases from the fluidized bed reactor are used to concentrate additional magnesium-base bisulfite spent liquor formed from ammonia-base spent liquor.

Apparatus including a fluidized bed reactor having a bed of magnesia particles, an exhaust gas conduit from the freeboard space of the reactor to a vessel for delivering magnesia fines, sulfur dioxide and other hot exhaust gases from the reactor to ammoniabase bisulfite spent liquor in the vessel, a conduit for delivering ammonia-base bisulfite spent liquor to the vessel, a conduit for delivering concentrated spent liquor from the vessel to the reactor for combustion therein, and means to absorb sulfur dioxide and ammonia from the vessel in aqueous ammonium hydroxide to form fresh ammonia-base bisulfite pulping liquor.

8 Claims, 2 Drawing Figures

APPARATUS FOR PRODUCING AMMONIA-BASE PULPING LIQUOR FROM SPENT LIQUOR

This invention relates to processes and apparatus for disposing of ammonia-base spent liquor from pulping. More particularly, this invention is concerned with processes and apparatus for disposing of ammonia-base spent liquor without pollution and recovery of useful chemicals therein for regenerating ammonia-base pulping liquor.

In the ammonia-base bisulfite process for pulping, wood chips are digested with ammonium bisulfite. During this digestion, a waste or spent liquor is produced which contains about 50 percent of the weight of the original wood and substantial quantities of sulfur and ammonia. The spent liquor usually contains not less than 5 percent, and not more than 15 percent total solids. The sulfur and ammonia exist in the spent liquor largely as ammonium salts of ligno sulfonic acid referred to generally as ammonium sulfolignate.

Disposal of ammonia-base bisulfite spent pulping liquors presents a serious problem because of air and water pollution which results when they are dumped in streams and lakes. Such disposal methods can no longer be tolerated so that a need exists for means to handle such waste liquors and dispose of them without pollution of the air or water. Furthermore, there is a need for nonpolluting disposal systems for ammonia-base bisulfite spent pulping liquors which permit recovery of at least some of the valuable chemicals therein so that they can be reused in making fresh ammonia-base bisulfite pulping liquor.

According to one aspect of the present invention, there is provided the process in which ammonia-base bisulfite spent pulping liquor is combined with magnesia and a magnesium-base bisulfite spent liquor, containing magnesium sulfolignate, thereby formed which is concentrated by means of heat from hot exhaust gases from a fluidized magnesia bed reactor in which the concentrated spent liquor containing magnesium sulfolignate and other organic materials is burned. Much of the magnesia needed to treat the ammonia-base bisulfite waste liquor is carried over as fines in the hot exhaust gases from the fluidized bed reactor. The hot exhaust gases and magnesia fines are advisably fed directly into contact with ammonia-base bisulfite spent liquor or advisably to such a liquor which has been previously at least partially treated with magnesia, and advisably also at least partially concentrated by evaporation of water.

The hot exhaust gases leave the fluidized bed reactor at about 1,600°F. or higher but are cooled to about 200°F. in heating and evaporating water from the spent liquor. The steam from the waste liquor, sulfur dioxide from the reactor exhaust gases, ammonia released from the waste liquor through the action of magnesia and other gases from the reactor are then brought into contact with cooling water to form a solution containing ammonium bisulfite and sulfurous acid. This solution is then brought into contact with aqueous ammonium hydroxide to convert the sulfurous acid to ammonium bisulfite and thereby yield a fresh ammonia-base bisulfite pulping liquor. The remaining undissolved gases are then vented to the atmosphere. They contain amounts of sulfur dioxide and ammonia which are so low as to be properly considered as non-polluting.

According to a further aspect of the invention there is provided a novel combination of apparatus which is particularly useful in practicing the described process. In a broad embodiment, the apparatus comprises a fluidized bed reactor having a bed of magnesia particles, an exhaust gas conduit from the freeboard space of the reactor to a vessel for delivering magnesia fines, sulfur dioxide and other hot exhaust gases from the reactor to ammonia-base bisulfite spent liquor in the vessel, a conduit for delivering ammonia-base bisulfite spent liquor to the vessel, a conduit for delivering magnesium-base bisulfite spent liquor from the vessel to the reactor for combustion therein, and means to absorb sulfur dioxide and ammonia from the vessel in water and ammonium hydroxide to form fresh ammonia-base bisulfite pulping liquor.

In another embodiment, the apparatus comprises a fluidized bed reactor having a bed of magnesia particles, an exhaust gas conduit from the freeboard space of the reactor to a contactor vessel for delivering magnesia fines, sulfur dioxide and other exhaust gases from the reactor to the contactor, a separator for separating sulfur dioxide, ammonia, steam and other gases from spent liquor, a conduit from the separator to the contactor for delivering spent liquor from the separator to the contactor, a conduit from the contactor to the separator for delivering a mixture of spent liquor, magnesia and exhaust gases from the contactor to the separator, a conduit for delivering ammonia-base bisulfite spent liquor to the separator, a conduit from the separator to the reactor for delivering concentrated magnesium-base bisulfite spent liquor from the separator to the reactor, and means to absorb sulfur dioxide and ammonia from the separator in water and ammonium hydroxide to form fresh ammonia-base bisulfite pulping liquor.

Figure 2:
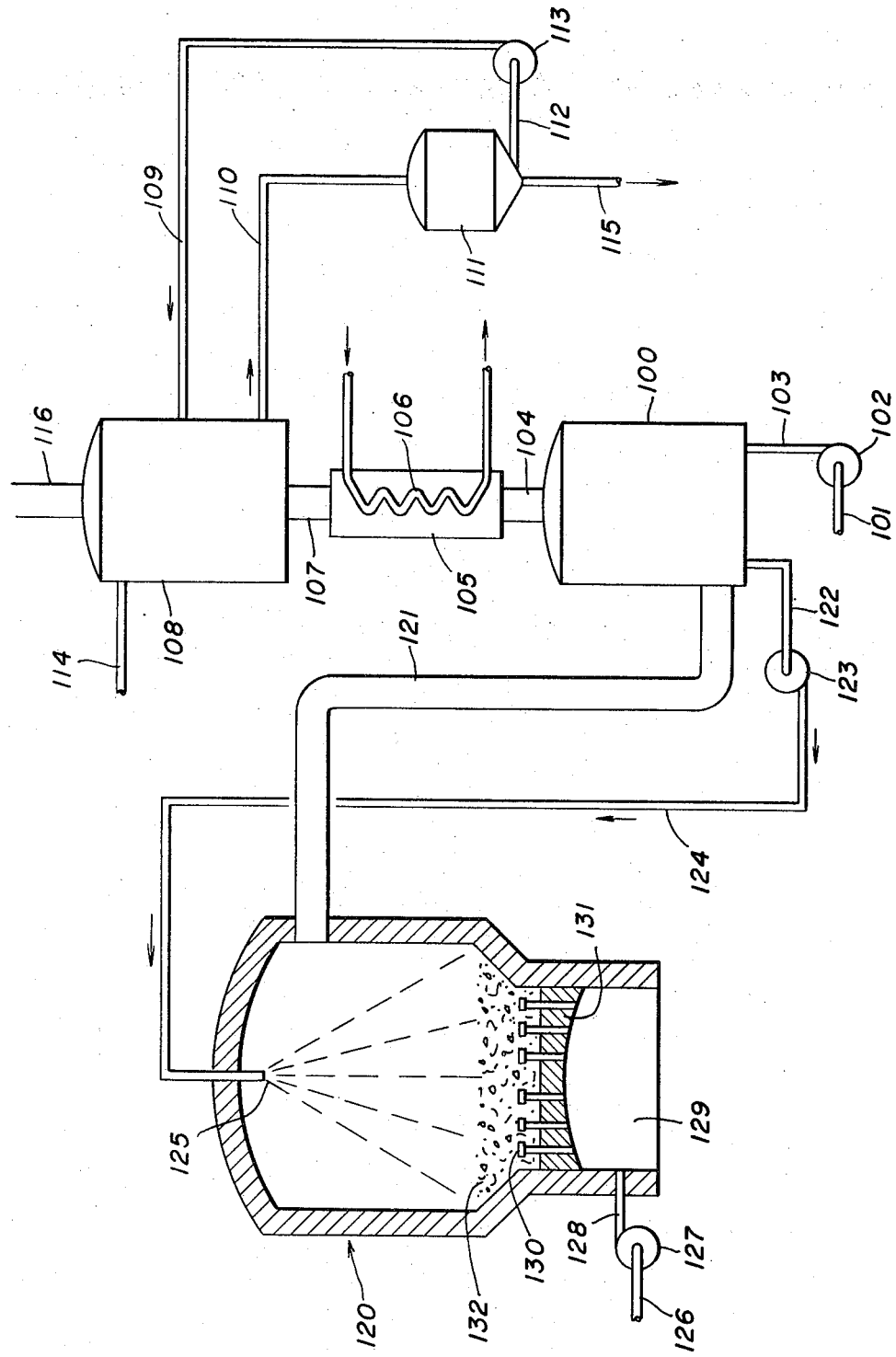

The invention will now be described further in conjunction with the attached drawings in which:

FIG. 1 shows schematically preferred apparatus for use in practicing the preferred process of the invention; and FIG. 2 shows schematically an alternative apparatus for practicing the invention.

With reference to FIG. 1 of the drawings, ammonia-base bisulfite spent liquor is fed by conduit 10 to pump 11 and from it to conduit 12 which delivers the spent dilute liquor to the separator tower 14 of tower 20. Tower 20 also includes an intermediate cooling tower 15 and an upper or top absorption tower 16.

Spent liquor is withdrawn from separator tower 14 by conduit 17 and pump 18 which conveys it to conduit 19 which feeds the spent liquor to contactor 30 which advisably is a wetted wall venturi scrubber. Hot exhaust gases containing sulfur dioxide and magnesia fines or particles are exhausted from the fluidized bed reactor in which magnesium-base bisulfite spent liquor containing magnesium sulfolignate is burned, the source of which will be described hereafter, by conduit 22 which feeds the hot gases and magnesia particles to contactor 30.

The hot gases and magnesia particles are at about 1,600°F. or higher when they reach contactor 30 by conduit 22. The spent liquor fed by conduit 19 to contactor 30 is at about 200°F. so that upon contact with the hot gases a large amount of steam is formed. In addition, such contact results in a chemical reaction or neutralization that results in the magnesium ion replacing the ammonium ion in the sulfolignate products and compounds present in the waste liquor. In this way ammonia is freed and the spent liquor is converted in part or entirely from an ammonia-base bisulfite spent liquor to what can be appropriately called a magnesium-base bisulfite waste liquor containing magnesium sulfolignates and other magnesium compounds.

The spent liquor and exhaust gases, including ammonia, sulfur dioxide and steam are conveyed from contactor 30 by conduit 21 to separator tower 14 in which the liquid phase is separated from gases and vapors, including steam, ammonia and sulfur dioxide. Evaporation of water to steam leads to concentration of the spent liquor from its initial maximum of about 15 percent by weight solids to about 25 to 40 percent by weight solids. By circulating the liquor one or more times through the loop comprising conduit 17, pump 18, conduit 19, contactor 30, conduit 21 and separator tower 14 the liquor can be concentrated to a solids level determined by the available heat in the exhaust gases.

The spent liquor fed through conduit 19 can be substantially a magnesium-base bisulfite spent liquor or it maybe mixed with ammonia-base bisulfite spent liquor. However, in practice it is expected that the spent liquor will comprise about 50—50 of each of these spent liquors. When the spent liquor in conduit 19 is concentrated to a level determined by the available heat in the exhaust gases, which concentration will usually be to at least about 25 percent by weight solids, part of the stream of spent liquor is diverted to conduit 41 and sprayed into the freeboard space 42 of fluidized bed reactor 40. The spent liquor falls to fluidized magnesia bed 43 where it burns, autogenously if sufficiently concentrated (35 percent by weight solids or higher) or by the aid of an auxiliary fuel supplied thereto by conventional means. Air is supplied by conduit 44 to pump 45 which pumps air to conduit 46 for delivery to wind box 47. The air under pressure flows from wind box 47 through nozzles 48 in constriction plate 49 and causes the bed of magnesia particles to be fluidized. The air oxidizes the spent liquor by combustion at about 1,400° to 2000°F. with the formation of hot combustion gases containing sulfur dioxide and entrained magnesia particles or fines which exhaust to conduit 22. An auxiliary conventional heating system can be used to start-up the reactor to bring it to combustion temperature.

Some of the magnesia from the spent liquor agglomerates in bed 43. To maintain control of the volume of the bed and size of the bed particles, some of the bed is advisably withdrawn periodically by conduit 51 and sent to grinder 52 from which magnesia fines are delivered by conduit 53 to slurry tank 54 which is supplied with water by conduit 55. Magnesium hydroxide aqueous slurry is conveyed from tank 54 by conduit 56 to the lower part of separator tower 14 to supply additional magnesia when and if needed to neutralize the ammonia-base bisulfite spent liquor. It is expected in practicing the invention to have at least 60 percent, and advisably 75 percent, by weight or more of the magnesia needed supplied by means of entrainment in the exhaust gases fed by conduit 22 to contactor 30. The remainder of the magnesia requirements for neutralizing the ammonia-base spent liquor can be supplied by other means, one of which is magnesia withdrawn as described from the fluidized bed reactor and circulated to the separator tower 14.

The separated gases, including sulfur dioxide and ammonia, at about 180° to 200°F., pass upwardly from separator tower 14 into cooling tower 15 where they come into contact with cooling water at about 50° to 100°F. supplied by conduit 61. The cooling water condenses steam from the gases and dissolves some of the sulfur dioxide and ammonia. The resulting cooling water solution is withdrawn at about 90° to 150°F. from cooling tower 15 by conduit 62 and passed through heat exchanger 60 to cool it and then to conduit 61. Conduit 63 supplies cold water or some other cooling or refrigerating fluid to heat exchanger 60 and it is removed therefrom by means of conduit 64.

Make up aqueous ammonium hydroxide is supplied by conduit 71 to the top of the absorption tower 16. Ammonium bisulfite solution is withdrawn from the lower part of absorption tower 16 by conduit 74 and conveyed to acid sump 75. The acid is recirculated from sump 75 by conduit 76 to pump 72 and then back by conduit 73 to the middle part of absorption tower 16. Some of the cooling water solution containing dissolved sulfur dioxide and ammonia is diverted from conduit 61 to conduit 65 and fed to conduit 73 for mixing with the liquid stream thereby supplied to absorption tower 16. The ammonium hydroxide solution together with the cooling water solution mixed therein flows downwardly countercurrent to flow of sulfur dioxide and ammonia which are absorbed to form additional amounts of the aqueous solution of ammonium bisulfite. By means of conduit 77 fresh ammonia-base bisulfite is removed from sump 75 and sent to a pulping mill as needed.

The nonabsorbed gases are vented from absorption tower 16 by vent 80 to the atmosphere. The vented gases are innocuous and comprise carbon dioxide, water vapor, nitrogen, and other inert gases from air and not more than minute amounts of sulfur dioxide.

FIG. 2 of the drawings illustrates another embodiment of the invention. In this embodiment, conduit 101 supplies ammonia-base bisulfite spent liquor, having about 5 to 15 percent by weight solids, to pump 102 which delivers the spent liquor to contactor-evaporator vessel 100. Hot exhaust gases from fluidized bed reactor 120 are conveyed by conduit 121 to vessel 100. The hot exhaust gases also contain a substantial quantity of magnesia fines or particles. The hot exhaust gases and magnesia fines are brought into direct contact with the ammonia-base bisulfite spent liquor in vessel 100 with the essentially simultaneous or contemporaneous formation of magnesium-base bisulfite waste liquor and its concentration. Ammonia is released in vessel 100 and it, together with sulfur dioxide and other exhaust gases from reactor 120, flow upwardly through vent 104.

The magnesium-base bisulfite waste liquor is conveyed from vessel 100 by conduit 122 to pump 123 which delivers it to conduit 124. The concentrated magnesium-base waste liquor is delivered by conduit 124 to a spray head 125 which sprays the liquor into the freeboard space of reactor 120. Conduit 126 feeds air to pump 127 which, by conduit 128, delivers the air under pressure to windbox 129. From windbox 129 the air flows through nozzles 130 in constriction plate 131 and thereby fluidizes a bed 132 of magnesia particles. The magnesium-base bisulfite waste liquor is burned in reactor 120 at a temperature of about 1,400°F. to 2,000°F. The burning can be autogenous if the liquor is sufficiently concentrated to contain enough combustible organic material, or an auxiliary fuel can be used to supply all or part of the necessary fuel.

The gases from conduit 104 are conveyed to chamber 105 where they are cooled from about 200°F. to 120°F. by heat exhange with water circulated through cooling coil 106. The cooled gases are then fed from chamber 105 by conduit 107 to absorber 108 where the gases are contacted, in part, with make-up ammonium hydroxide solution supplied to the upper part of absorber 108 by conduit 114 and in part with ammonium bisulfite supplied by conduit 109 to the middle part of absorber 108. The ammonia and sulfur dioxide in the gases are absorbed and additional ammonia-base bisulfite pulping acid is formed. The nonabsorbed gases are vented by conduit 116 from absorber 108. Such gases are essentially devoid of polluting materials. The acid is conveyed from the bottom part of absorber 108 by conduit 110 to acid tank 111. The acid can be circulated from tank 111 by conduit 112 to pump 113 which delivers it to conduit 109. In this way, the acid concentration can be increased. After fresh ammonia-base bisulfite pulping liquor is formed, it can be withdrawn from tank 111 by conduit 115 and sent to a pulping mill as needed.

EXAMPLE

Ammonia-base bisulfite spent pulping liquor containing 12.25 percent by weight total solids is fed at 160°F. by line 12 to separator 14 as shown in FIG. 1. The liquor is fed at a rate of 273,566 lbs./hr. of which 33,528 lbs. is solids and 240,038 lbs. is water. Magnesia is fed by line 56 at 136 lbs./hr. in an aqueous slurry to separator 14.

Air at 150°F. is supplied to the air box 47 of reactor 40 at a pressure of about 5 psig. and a rate of 248,270 lbs./hr (55,550 cubic feet/min.). Magnesium-base bisulfite spent liquor containing 31 percent by weight solids from separator 14 is delivered by conduits 19 and 41 at 121,000 lbs./hr. (37,462 lbs. of solids and 83,538 lbs. of water) to the freeboard 42 of reactor 40. Autogenous combustion is effected in the reactor of the organic content of the spent liquor at 1,600°F. The exhaust gases containing magnesia particles are vented from the reactor at 351,328 lbs./hr. (188,400 lbs. $N_2$, 9,375 lbs. $O_2$, 48,350 lbs. $CO_2$, 4,945 lbs. $SO_2$, 544 lbs. MgO and 100,802 lbs. steam; vol. percent: 48.9 $N_2$, 21.1 $O_2$, 8 $CO_2$, 0.6 $SO_2$, 40.4 $H_2O$) to the venturi scrubber 30 where they are washed with a mixture of magnesium-base bisulfite, and ammonia-base bisulfite, spent liquors supplied by conduit 19. The hot mixture of spent liquor and gases is conveyed by conduit 21 from the scrubber to separator 14. Ammonia is freed in separator 14 and a dilute magnesium-base bisulfite spent liquor is formed. A total of 508,310 lbs./hr. of gases at 189°F. pass from the separator to the cooling tower 15. The composition of the gases is 482 lbs. of $NH_3$, 188,400 lbs. $N_2$, 9375 lbs. $O_2$, 48,350 lbs. $CO_2$, 4945 lbs. $SO_2$ and 256,758 lbs. $H_2O$ (vol. percent: 0.2 percent $NH_3$, 29.9 percent $N_2$, 1.3 percent $O_2$, 4.9 percent $CO_2$, 0.3 percent $SO_2$, 63.4 percent $H_2O$).

The gases are cooled in the cooling tower 15 to 150°F. and sent to the absorption tower 16. Part of the cooling water solution containing dissolved sulfur dioxide and ammonia, is diverted from conduit 61 and fed to conduit 65 which delivers it to the ammonia-base bifulfite solution supplied by conduit 73 to absorption tower 16. Make-up aqueous ammonium hydroxide containing 25 percent ammonia is fed by conduit 71 at a rate of 2,800 lbs./hr. to the upper part of absorption tower 16. Product acid, i.e., ammonia-base bisulfite pulping liquor at 145°F., is removed from absorption tower 16 by conduit 74 at a rate of 21,283 lbs./hr. (4,450 lbs. $SO_2$, 1,182 lbs. $NH_3$, 20,651 lbs. $H_2O$). The gases vented to the atmosphere by conduit 80 from absorption tower 16 contain less than 0.1 vol. percent of sulfur dioxide.

The foregoing detailed description has been given for clearness of understanding only, and no unnecessary limitations should be understood therefrom as modifications will be obvious to those skilled in the art.

What is claimed is:

1. Apparatus comprising:
   a fluidized bed reactor having a bed of magnesia particles;
   an exhaust gas conduit from the freeboard space of the reactor to a vessel for delivering magnesia fines, sulfur dioxide and other hot exhaust gases from the reactor to ammonia-base bisulfite spent liquor in the vessel;
   a conduit for delivering ammonia-base bisulfite spent liquor to the vessel;
   a conduit for delivering concentrated spent liquor from the vessel to the reactor for combustion of the liquor therein; and
   means to absorb sulfur dioxide and ammonia from the vessel in aqueous ammonium hydroxide to form fresh ammonia-base bisulfite pulping liquor.

2. Apparatus comprising:
   a fluidized bed reactor having a bed of magnesia particles;
   an exhaust gas conduit from the freeboard space of the reactor to a contactor vessel for delivering magnesia fines, sulfur dioxide and other hot exhaust gases from the reactor to the contactor;
   a separator for separating sulfur dioxide, ammonia, steam and other gases from spent liquor therein;
   a conduit from the separator to the contactor for delivering spent liquor from the separator to the contactor;
   a conduit from the contactor to the separator for delivering a mixture of spent liquor, magnesia and exhaust gases from the contactor to the separator;
   a conduit for delivering ammonia-base bisulfite spent liquor to the separator;
   a conduit from the separator to the reactor for delivering concentrated spent liquor containing magnesium-base bisulfite spent liquor from the separator to the reactor; and
   means to absorb sulfur dioxide and ammonia from the separator in aqueous ammonium hydroxide to form fresh ammonia-base bisulfite pulping liquor.

3. Apparatus for producing ammonia-base bisulfite pulping liquor from spent ammonia-base bisulfite liquor while avoiding the emission of environment contaminants, comprising:
   a fluidized bed reactor having a bed comprising particles of magnesia and a freeboard space above the bed;
   a scrubber;
   means for contacting, in said scrubber, said spent liquor containing organics from wood, water and ammonium bisulfite with magnesia, sulfur dioxide and water, to form an aqueous solution of magnesium bisulfite and a gaseous mixture comprising ammonia and sulfur dioxide;

means for burning said solution in oxygen in said reactor at a bed temperature of about 1,400° to 2,000°F. to produce exhaust gases comprising carbon dioxide, water vapor and sulfur dioxide;

means for conveying said exhaust gases from the reactor to said scrubber as a source of said sulfur dioxide;

means for conveying magnesia from said bed to said means for contacting;

means for reacting said gaseous mixture with aqueous ammonium hydroxide to produce an aqueous solution of ammonium bisulfite as said ammonia-base pulping liquor; and means for venting unreacted gases from said means for reacting, said gases being innocuous and comprising carbon dioxide, water vapor and not more than a minute amount of unreacted sulfur dioxide.

4. The apparatus of claim 3 wherein said means for contacting comprises a scrubber, a separator, a conduit circuit interconnecting said scrubber and separator and means for circulating said spent liquor, magnesia, sulfur dioxide and water in said circuit.

5. The apparatus of claim 3 wherein said means for conveying magnesia from said bed to said means for contacting comprises means for mixing water with said magnesia after being withdrawn from the bed.

6. The apparatus of claim 3 wherein said means for reacting comprises an absorption tower having means for conveying said aqueous ammonium hydroxide through the absorption tower and means for conveying said gaseous mixture to said absorption tower for reaction with said aqueous ammonium hydroxide therein.

7. The apparatus of claim 6 wherein there are provided means for circulating ammonium bisulfite solution from said absorption tower and back to said tower in a loop exteriorly of said tower, and means are provided for introducing said aqueous ammonium hydroxide into the absorption tower at a space above the ammonium bisulfite solution.

8. Apparatus for producing ammonia-base bisulfite pulping liquor from spent ammonia-base bisulfite liquor while avoiding the emission of environment contaminants, comprising:

a fluidized bed reactor having a bed comprising particles of magnesia and a freeboard space above the bed;

a scrubber;

means for contacting, in said scrubber, said spent liquor containing organics from wood, water and ammonium bisulfite with magnesia, sulfur dioxide and water, to form an aqueous solution of magnesium bisulfite and a gaseous mixture comprising ammonia and sulfur dioxide;

means for burning said solution in oxygen in said reactor at a bed temperature of about 1,400° to 2,000°F. to produce exhaust gases comprising carbon dioxide, water vapor and sulfur dioxide;

means for conveying said exhaust gases from the reactor to said scrubber as a source of said sulfur dioxide;

means for conveying magnesia from said bed to said means for contacting;

an absorption tower having means for conveying said aqueous ammonium hydroxide through the absorption tower and means for conveying said gaseous mixture to said absorption tower for reaction with said aqueous ammonium hydroxide therein to produce an aqueous solution of ammonium bisulfite as said ammonia-base pulping liquor;

means for venting unreacted gases as a mixture from said means for reacting, said gases being innocuous and comprising carbon dioxide, water vapor and not more than a minute amount of unreacted sulfur dioxide;

a separator for separating liquid from said gaseous mixture;

means for connecting said scrubber and separator in a liquid flow loop;

a cooling tower between said absorption tower and the separator;

means for flowing said gaseous mixture from said separator through said cooling tower and to said absorption tower; and means for circulating gases from said tower through a cooling heat exchanger externally of the cooling tower.

* * * * *